(12) United States Patent
Fernandez et al.

(10) Patent No.: US 11,814,170 B2
(45) Date of Patent: Nov. 14, 2023

(54) AIRCRAFT PACKAGE DELIVERY MOUNTING SYSTEM

(71) Applicant: Skyway Technologies Corp., San Rafael, CA (US)

(72) Inventors: Clifford Fernandez, San Rafael, CA (US); Kurt Grutzmacher, San Rafael, CA (US); Derrick Harry Lewis, San Rafael, CA (US)

(73) Assignee: SKYWAY TECHNOLOGIES CORP., San Rafael, CA (US)

( * ) Notice: Subject to any disclaimer, the term of this patent is extended or adjusted under 35 U.S.C. 154(b) by 332 days.

(21) Appl. No.: 17/167,693

(22) Filed: Feb. 4, 2021

(65) Prior Publication Data

US 2022/0242560 A1   Aug. 4, 2022

(51) Int. Cl.
*B64C 39/02* (2023.01)
*A47G 29/30* (2006.01)
(Continued)

(52) U.S. Cl.
CPC .......... *B64C 39/024* (2013.01); *A47G 29/141* (2013.01); *A47G 29/30* (2013.01); *B64F 1/20* (2013.01); *A47G 2029/146* (2013.01); *A47G 2029/149* (2013.01); *B64U 70/00* (2023.01); *B64U 2101/60* (2023.01)

(58) Field of Classification Search
CPC ...... A47G 29/141; A47G 29/20; A47G 29/22; A47G 29/30; A47G 2029/145; A47G 2029/146; A47G 2029/149; B64C 39/024; B64F 1/20; B64F 1/32; B64U 70/00; B64U 2101/60; B64D 1/02; B64D 1/12; G06Q 10/0836; G06Q 10/0832; G06Q 50/28

USPC ....... 232/19, 45; 340/569; 244/144 R, 118.1, 244/118.2, 137.1, 137.4; 705/330
See application file for complete search history.

(56) References Cited

U.S. PATENT DOCUMENTS 9,211,025 B1 * 12/2015 Elhawwashy .......... A47G 29/20
10,351,261 B1 * 7/2019 Bryant ..................... B64F 1/32
(Continued)

FOREIGN PATENT DOCUMENTS

CN   109805724 A   5/2019
CN   110937294 A   3/2020
(Continued)

OTHER PUBLICATIONS

International Search Report and Written Opinion dated May 13, 2022 for the International Patent Application No. PCT/US2022/015302.

*Primary Examiner* — William L Miller
(74) *Attorney, Agent, or Firm* — AMPACC Law Group, PLLC (57) ABSTRACT

Systems and methods for receiving packages from drones and other unmanned aerial vehicles (UAVs) are described. The systems can include a delivery package mounting unit, such as a unit configured to mount to the outside of a house or building, configured and adapted to facilitate the landing of a drone to the unit and receive to multiple packages from the drone and/or one or more other drones. In some embodiments, the mounting unit includes a landing tray configured to facilitate the landing of a drone to the unit, and a movable package tray configured to receive packages and other cargo from the drone.

18 Claims, 9 Drawing Sheets

(51) Int. Cl.
  *B64F 1/20* (2006.01)
  *A47G 29/14* (2006.01)
  *B64U 70/00* (2023.01)
  *B64U 101/60* (2023.01)

(56) References Cited

U.S. PATENT DOCUMENTS

| | | | | |
|---|---|---|---|---|
| 10,993,569 | B2* | 5/2021 | Gil | A47G 29/22 |
| 11,045,031 | B2* | 6/2021 | Ritchie | A47G 29/141 |
| 11,259,663 | B2* | 3/2022 | Gil | A47G 29/22 |
| 11,352,148 | B2* | 6/2022 | Svirsky | B64F 1/222 |
| 11,379,784 | B1* | 7/2022 | Eastman | B64C 39/024 |
| 2015/0158599 | A1* | 6/2015 | Sisko | B64F 1/20 |
| | | | | 244/114 R |
| 2015/0175276 | A1* | 6/2015 | Koster | B64F 1/00 |
| | | | | 244/114 R |
| 2015/0183528 | A1* | 7/2015 | Walsh | A01M 29/16 |
| | | | | 244/114 R |
| 2016/0364989 | A1* | 12/2016 | Speasl | B64F 1/222 |
| 2018/0070753 | A1* | 3/2018 | Eveloff | H04W 4/025 |
| 2018/0092484 | A1* | 4/2018 | Lewis | A47G 29/20 |
| 2018/0105289 | A1* | 4/2018 | Walsh | G06Q 50/28 |
| 2018/0352988 | A1* | 12/2018 | Ortiz | A47G 29/141 |
| 2019/0135433 | A1* | 5/2019 | Goovaerts | B64F 1/14 |
| 2019/0300202 | A1* | 10/2019 | High | B64F 1/368 |
| 2019/0343317 | A1* | 11/2019 | Cantrell | G07C 9/00563 |
| 2020/0048951 | A1* | 2/2020 | Herschap | G07C 9/38 |
| 2020/0113365 | A1 | 4/2020 | Shobe | |
| 2020/0180880 | A1* | 6/2020 | Gil | B64C 39/024 |
| 2020/0207485 | A1* | 7/2020 | Foggia | B64F 1/00 |
| 2020/0231393 | A1* | 7/2020 | Mercado | B64F 1/368 |
| 2020/0281386 | A1* | 9/2020 | Knox | A47G 29/22 |
| 2021/0007523 | A1* | 1/2021 | Baek | A47G 29/141 |
| 2021/0196069 | A1* | 7/2021 | Likins | A47G 29/16 |
| 2021/0228009 | A1* | 7/2021 | Nakanishi | E05B 47/00 |
| 2021/0284450 | A1* | 9/2021 | Wang | B64F 1/005 |
| 2021/0321810 | A1* | 10/2021 | Sun | A47G 29/30 |
| 2021/0394930 | A1* | 12/2021 | O'Toole | B64F 1/362 |
| 2022/0007871 | A1* | 1/2022 | Schwarz | A47G 29/30 |
| 2022/0055770 | A1* | 2/2022 | O'Toole | B64F 1/364 |
| 2022/0192406 | A1* | 6/2022 | Haley | A47G 29/20 |

FOREIGN PATENT DOCUMENTS

| | | |
|---|---|---|
| KR | 20150140556 A | 12/2015 |
| KR | 20200037569 A | 4/2020 |
| WO | 2020-118552 A1 | 6/2020 |

* cited by examiner

AIRCRAFT PACKAGE DELIVERY MOUNTING SYSTEM

BACKGROUND

Drones and other UAVs (Unmanned Aerial Vehicles) have many different uses, including surveillance, package delivery, remote sensing, exploration and monitoring of locations, construction and surveying applications, and so on. While the control and management of individual drones can be managed, scenarios that utilize many different drones (from different entities) can introduce complexities and issues relating to the use of drones (or groups or fleets of drones) during the delivery of packages and other objects, among other drawbacks.

For example, the prevalence of drones can lead to congestion, such as congestion in an area or location having a high volume of package deliveries. Thus, it can be difficult to successfully navigate a drone from one point to another within a congested area or location.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Systems and methods for receiving packages from drones and other unmanned aerial vehicles (UAVs) are described. The systems can include a delivery package mounting unit, such as a unit configured to mount to the outside of a house or building, configured and adapted to facilitate the landing of a drone to the unit and receive multiple packages from the drone and/or one or more other drones.

The mounting unit, in some embodiments, can be mounted at heights that enable drone access, while also enabling recipients of packages (e.g., people at the location) to access their packages. Further, the mounting unit includes components configured to manage correct landing placements of drones to the unit, as well as components that notify users that packages have been delivered. Thus, the systems and methods described herein enable drones to efficiently and safely deliver packages to houses, buildings, and other structures or locations, among other benefits.

In the following description, for the purposes of explanation, numerous specific details are set forth in order to provide a thorough understanding of implementations of the present technology. It will be apparent, however, to one skilled in the art that implementations of the present technology can be practiced without some of these specific details. The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Examples of the Package Delivery Mounting Unit and Associated Systems

As described herein, the systems and methods provide a delivery system and associated mounted units for drones to navigate to/from when delivering packages within a location, such as a city, area, neighborhood, campus, or other geographic location.

Figure 1:
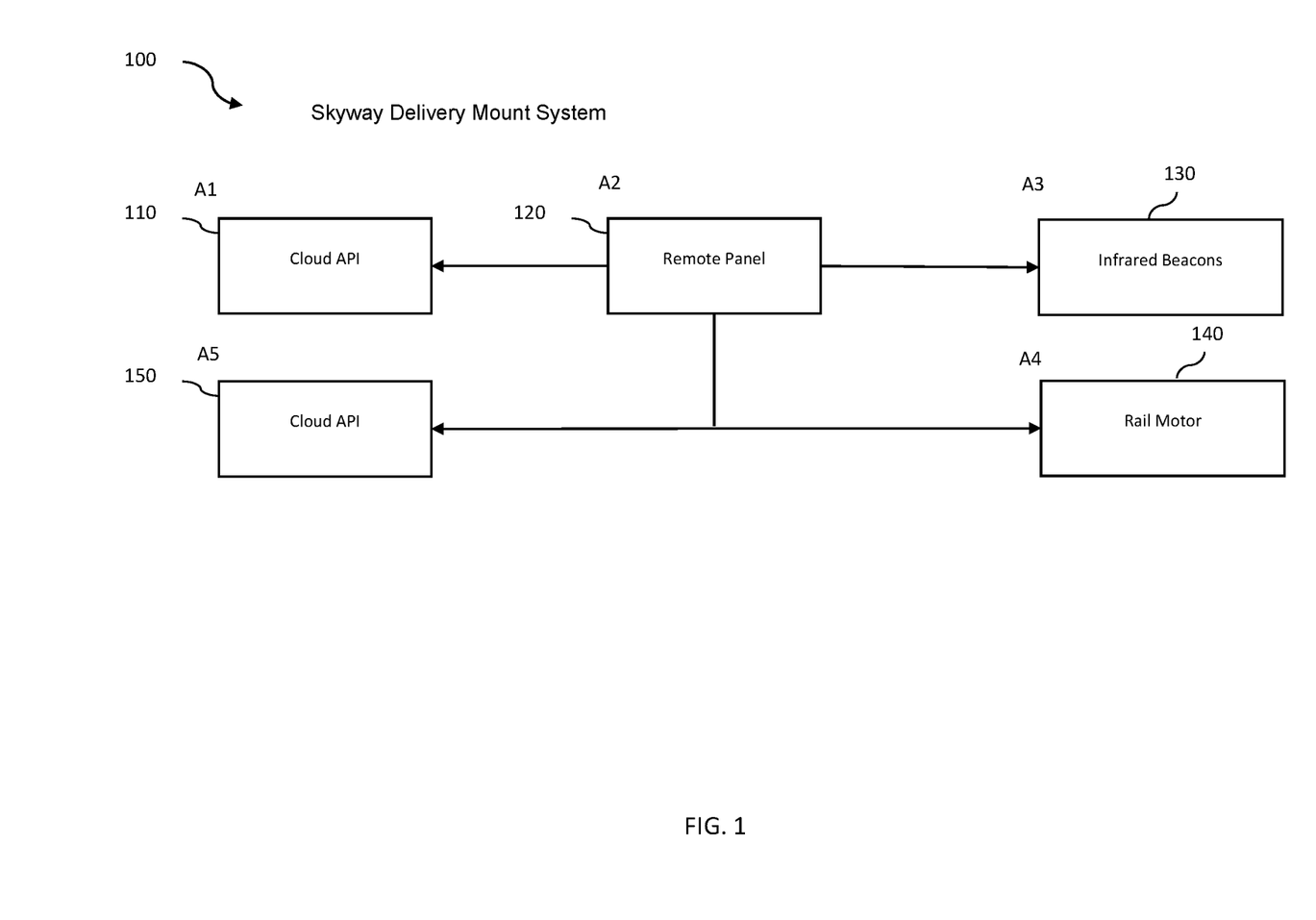
FIG. 1 is a diagram illustrating components of a delivery mount system.

FIG. 1 is a diagram illustrating components of a delivery mount system 100.

The system 100 can communicate, via cloud APIs, with various cloud servers, which monitor deliveries of packages and/or locations of drones, such as when a drone mounts a unit to deliver a package. The system 100 can also include a user interface 120, such as a touchscreen display, and associated control systems, which supply power, communication mechanisms, and display information. For example, the display 120 can receive input from users, can display delivery status information, and so on.

Infrared beacons 130 facilitate the landing or mounting of a drone to the unit. For example, the beacons emit an infrared signal, which is picked up by a drone and enables the drone to align with the unit (e.g., via a package drop zone) when accessing and landing on the unit. In some cases, the infrared beacons 130 can have a serial number as identifier, where the beacons 130 pulse or transmit an address of an associated building or home, which is received and/or tracked by a drone.

A rail motor 140 controls movement of components via a rail assembly, such as an assembly including a landing tray and package delivery tray, facilitating the delivery of one or more packages. Further, a camera 150 or other optical component can monitor the delivery and assist in navigation or confirmation of package deliveries.

In addition, in some cases, a unit can include weather sensors, such as sensors that detect wind speed and direction, precipitation, temperature, humidity, barometric pressure, and so on. Such sensors may individually measure a specific weather parameter, or can be all-in-one sensors that measure many or multiple weather parameters. Using such information, the unit can communicate to delivery drones that the weather at the unit at a specific time is acceptable (e.g., clear day, low wind) or prohibitive (e.g., high winds) for deliveries to occur.

FIG. 1 and the components depicted herein provide a general computing environment and network within which the system 100 can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network can be any network, ranging from a wired or wireless local area network (LAN), to a wired or wireless wide area network (WAN), to the Internet or some other public or private network. While the connections between the system and other aspects are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Figure 2:
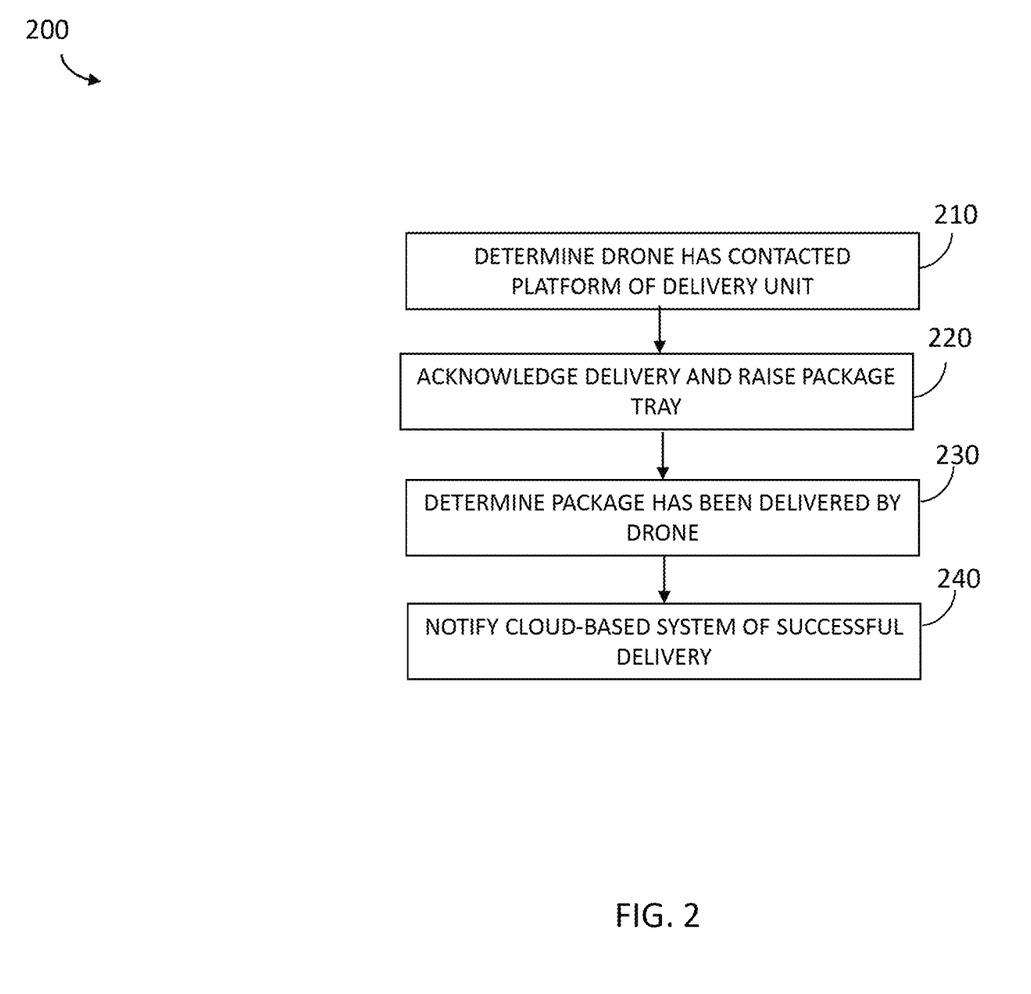
FIG. 2 is a flow diagram illustrating an example method of receiving a package from a drone.

As described herein, the system 100 operates to facilitate an efficient and safe delivery of packages via a drone. FIG. 2 is a flow diagram illustrating an example method 200 of receiving a package from a drone.

A drone arrives at a designated zone area of the delivery system (e.g., within a set meter cubic space). The drone searches for infrared beacons that act as a marker target for drone positioning.

Further, the drone can scan a QR code or other identifier to verify the delivery address target for the mounting system. In some cases, a provided verification mechanism ensures a capture of information provided at the location by the mounting unit, to ensure the drone is at the correct physical location when delivering a package. Thus, the verification mechanism can include the capture of a QR code or other image or identifier, communication with an RF (radio frequency (500 Mhz to 1200 Mhz or 54 Mhz to 120 Mhz)), Bluetooth, or other interrogable component of the mounting unit, and so on. Once the address target is verified, the drone lands on a platform of the delivery system.

In operation 210, the system determines the drone has landed or otherwise contacted a landing platform of the mounting unit. For example, the system may utilize a information captured by a force sensor to determine the drone has landed or respond to confirmation that the drone is at a correct delivery unit.

In operation 220, the system acknowledges the delivery (or contact with the landing platform) and raises a package tray to receive the delivery. For example, the system can communicate with the drone to acknowledge the landing of the drone, facilitating a package delivery.

In operation 230, the system determines a package has been delivered by a drone. For example, in response to the drone dropping a package to the package tray, the system, via information captured by force sensors of the package tray, acknowledges receipt of the package, and lowers the tray.

In operation 240, the system sends a receipt notification. For example, via the cloud API 110, the system sends a notification of a successful delivery of a package from the drone. The system can notify the drone, the package delivery entity associate with delivery of the package, a user or recipient associated with the mounting unit, and so on.

As described herein, the mounting unit includes various components for enabling safe drone landings and package deliveries at dwellings, buildings, and other locations. FIGS. 3-7 illustrate different views of an example delivery mount unit.

Figure 3:
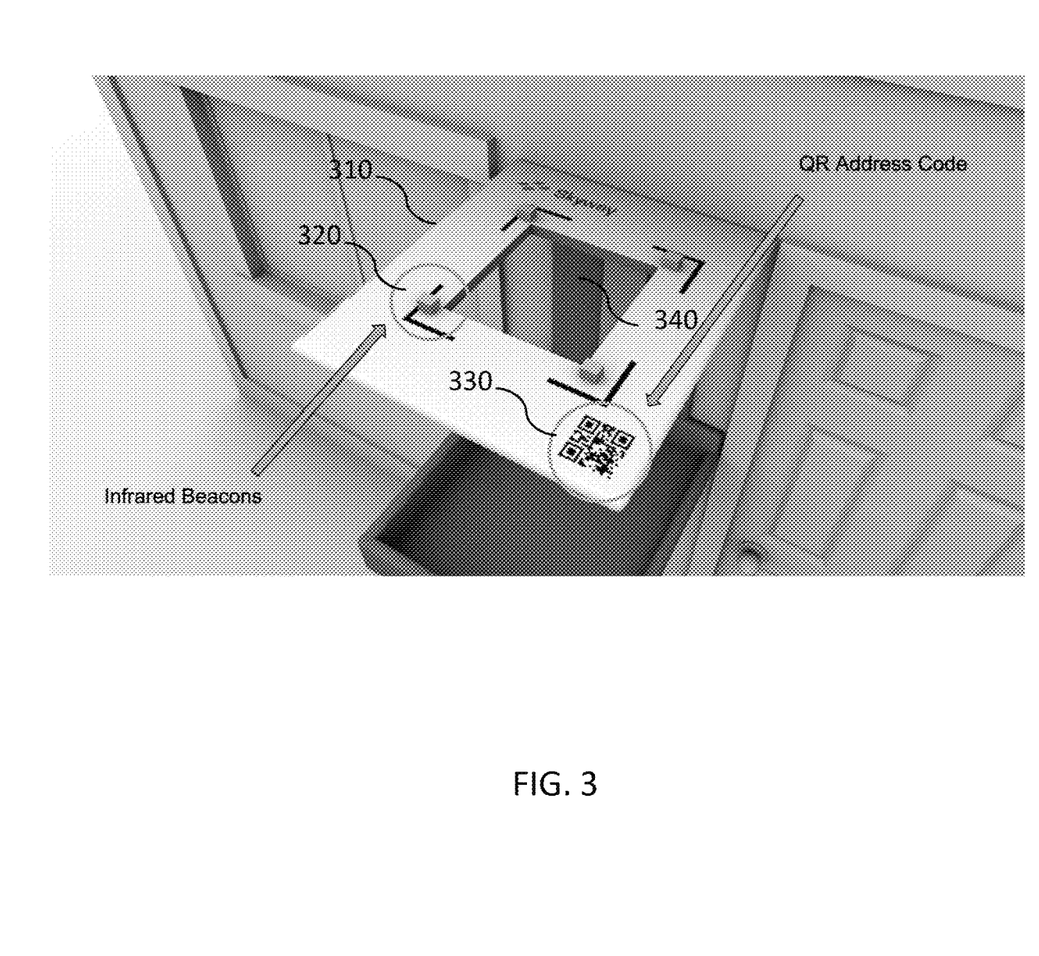
FIG. 3 is a diagram illustrating a delivery unit including a mounting tray.

First, FIG. 3 depicts a mounting tray 310. The mounting tray 310 includes infrared (IR) beacons 320 that facilitate navigation and alignment of a drone to the tray 310, and a QR code 330 that identifies the tray (e.g., provides an address or identifier for the tray 310 or unit). Thus, a drone proximate to the unit can determine the correct delivery address via the QR code 330 and align itself with the mounting tray 310 via the IR beacons 320.

The mounting tray 310 also includes an aperture 340 or opening, which facilitates the movement of packages from the drone to a tray or location below the mounting tray 310, such as a package reception tray or chute. The aperture 340 is configured to enable the drone to drop or place packages into the mounting unit when disposed on or proximate to the mounting tray 310.

Figure 4:
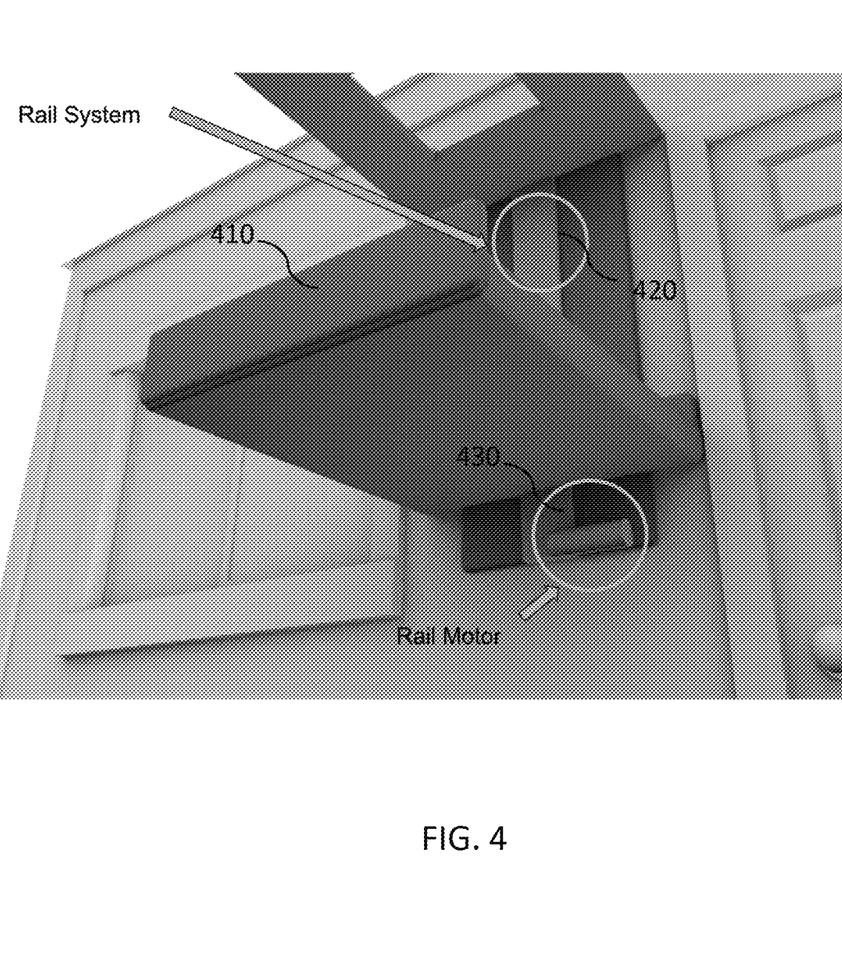
FIG. 4 is a diagram illustrating a delivery unit including a rail system.

FIG. 4 depicts a rail system configured to move a package tray 410 in a vertical direction along a rail 420. The rail system is controlled by a motor 430, which causes the package tray 410 to move towards a mounting tray 310 when a drone has landed and is dropping a package. Once a package has been dropped into the package tray 410, the motor 430 causes the package tray 410 to move back down and away from the mounting tray. Movement of the package tray 410 can facilitate efficient and safe reception of packages, as the distance through which packages are dropped or otherwise placed into the mounting unit and to the package tray 410 can be reduced, while also enabling the package tray 410 to lower and distribute received packages.

Figure 5:
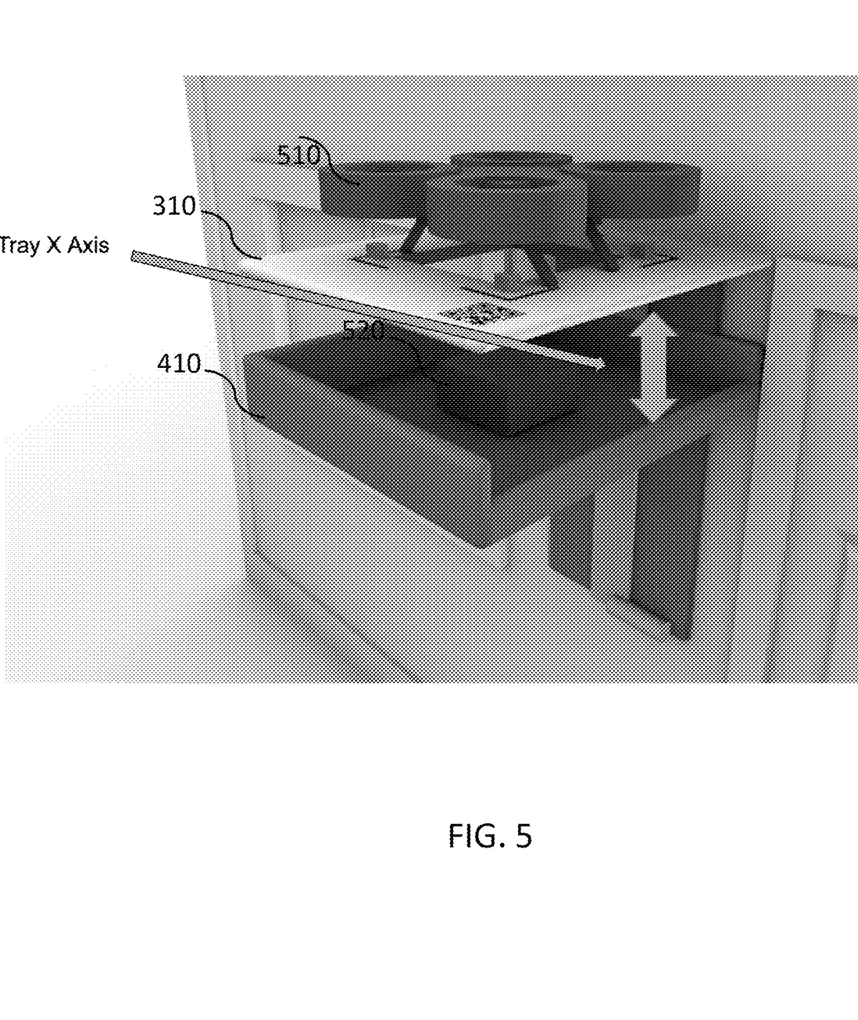
FIG. 5 is a diagram illustrating a delivery unit including a drone located on a mounting tray.

For example, FIG. 5 depicts the delivery of a package 520 to the delivery unit via a drone 510. The drone 510, as described herein, lands on the landing tray 310, and drops the package 520 via an opening in the landing tray 310. The package tray 410 collects the package 520, and then moves away from the landing tray 310.

Figure 6:
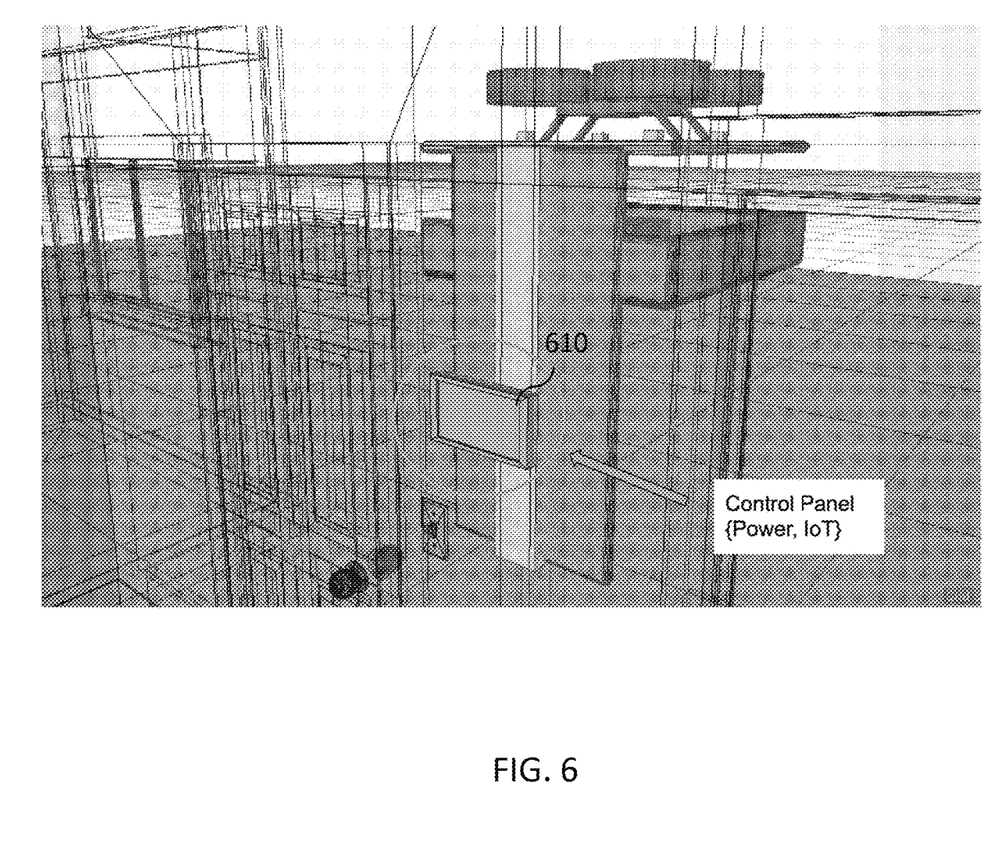
FIG. 6 is a diagram illustrating a delivery unit including a display unit.

FIG. 6 depicts a control unit 610 or display for the delivery unit. The control unit 610 can control operations of the unit, including operations of the motor 430, communication operations (e.g., the unit can act as an IoT device), can power the unit, and so on. Further, the display can provide notifications, such as notifications about delivery statuses, package information, and so on.

Figure 7:
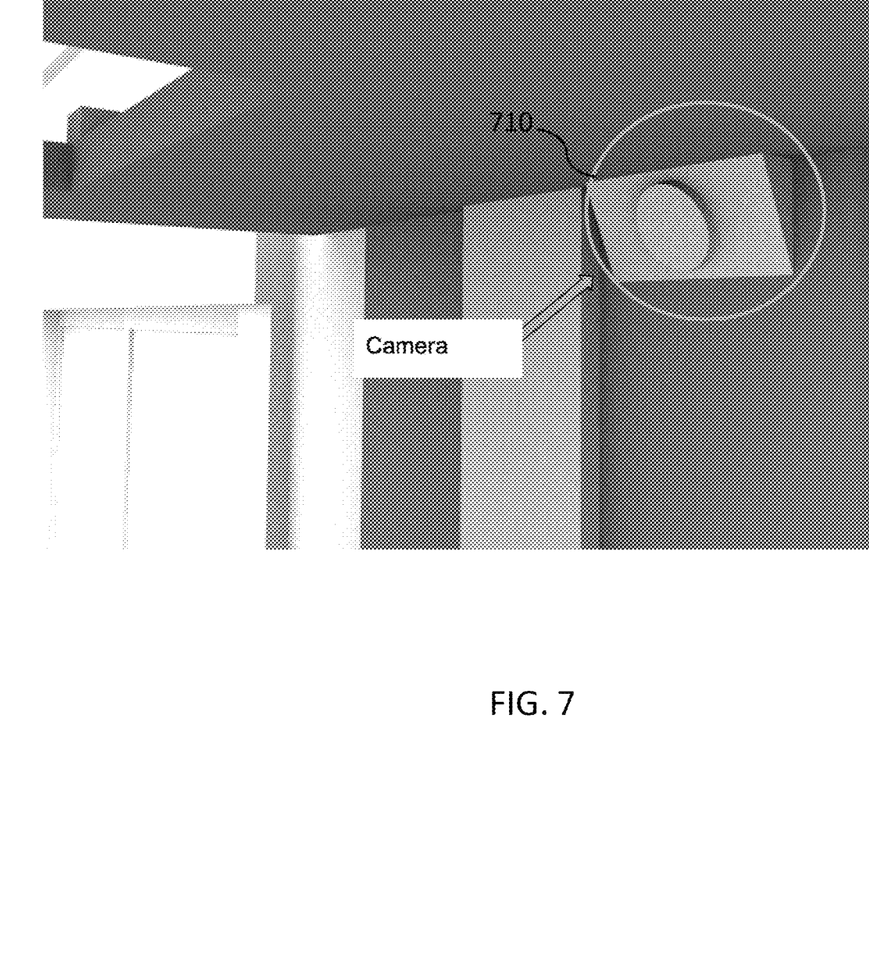
FIG. 7 is a diagram illustrating a delivery unit including a camera module.

FIG. 7 depicts a camera module 710 within the unit. As described herein, the camera module 710 can monitor package deliveries and other activities associated with the delivery unit. For example, the camera module 710 (and/or a force sensor) can determine the package tray 410 is full and send an alert to an owner or user to get the packages.

The mounting unit can include other features or components not depicted by the Figures. For example, the package unit 410 can be associated with a storage locker component, or location, a delivery chute or area, or other space, area, or container configured to receive, and store, delivered packages. To keep packages secure, the package unit 410 may move from vertically out of a secure container in order to receive a package from a drone, and then move back into the secure container once the package has been received. Thus, the mounting unit, in some embodiments, acts in tandem with a storage container or delivery portal, facilitating the delivery of packages and other cargo by drones over time at a location or building.

Figure 8:
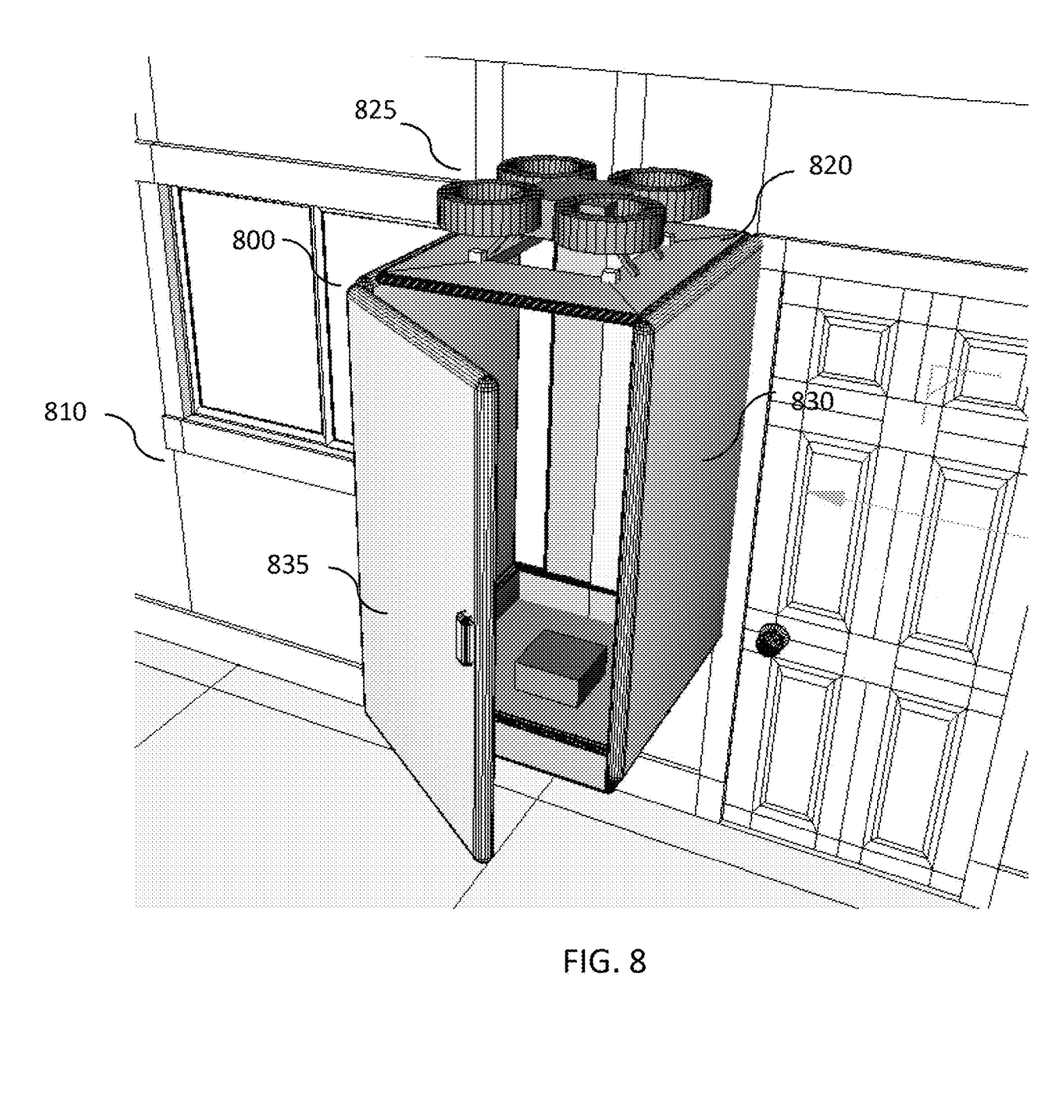
FIG. 8 is a diagram illustrating a delivery unit securely located outside of an associated building.

In addition, in some embodiments, the package unit 410 is attached to or otherwise associated with a secure container. FIG. 8 is a diagram illustrating a delivery or package unit 800 securely located outside of an associated building 810.

The delivery unit 800 includes a landing tray 820, which, as described herein, is configured to receive a drone 825 and facilitate the delivery of packages by the drone 825 to the delivery unit 800. The unit 800 also includes a secured area or container 830, which can include a package tray, as described herein. The secured area or container 830 is accessible via an external door 835, which can be locked or otherwise secured. Thus, the drone 825 lands on the landing tray 820, delivers the package via an opening of the landing tray 820 into the secured area 830.

Figure 9:
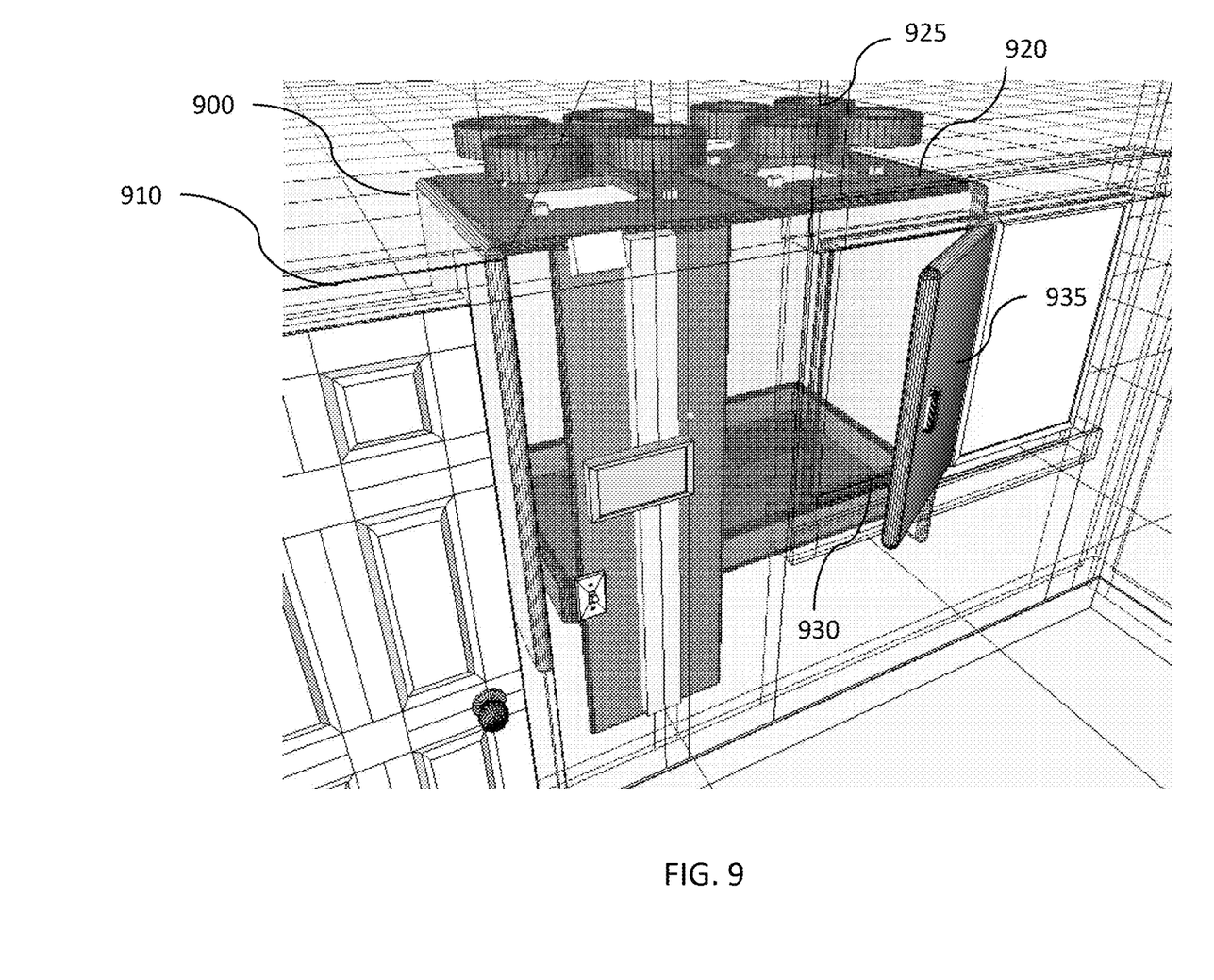
FIG. 9 is a diagram illustrating a delivery unit securely located internal to an associated building.

FIG. 9 is a diagram illustrating a delivery unit 900 securely located internal to an associated building 910. The delivery unit 900 includes a landing tray 920, which, as described herein, is configured to receive one or more drones 925 and facilitate the delivery of packages by the drones 925 to the delivery unit 900. The unit 900 also includes a secured area or container 930, which can include a package tray, as described herein. The secured area 930, as depicted, is at least partially disposed within the building 910, and includes a door 935 or other opening that allows for access into the container 930 from inside the building 910. Thus, the drones 925 land on the landing tray 920, which is external to the building 910. The drones 925 deliver the package via an opening of the landing tray 920 into the secured area 930, accessible to users within the building.

Thus, in some embodiments, the systems described herein utilize and/or provide an apparatus for receiving a package delivery from a drone, including a landing tray configured to receive a drone delivering a package to a house, where the landing tray includes an opening configured to allow packages from the drone to fall through the landing tray, and a package tray disposed below the landing tray and configured to receive the packages from the drone that pass through the opening of the landing tray.

As described herein, the landing tray can include one or more infrared beacons that facilitate the drone to align with the opening when landing on the landing tray and/or a QR code (or other physical or displayed identifier) associated with an address of the house that is captured by the drone in order for the drone to confirm a correct address for delivery of the packages.

The mounting unit can also include a rail assembly configured to move the package tray in a vertical direction towards the package tray when receiving the packages from the drone that pass through the opening of the landing tray. In some cases, the unit is part of or associated with a secure container that is configured to store delivered packages for the house, and the rail assembly is configured to move the package tray out of the secure container in a vertical direction towards the landing tray when receiving the packages from the drone that pass through the opening of the landing tray, and move the package tray back into the secure container in the vertical direction when the packages from the drone have been delivered to the package tray.

Further, the mounting unit can include a control unit that sends a notification to a user associated with the house that the packages have been delivered when the packing tray receives the packages, and/or sends a notification to an entity sending the packages that the packages have been delivered when the packing tray receives the packages. The control unit can also send a notification that the packages have been delivered when a camera of the apparatus captures an image of the packages disposed within the package tray.

As described herein, in some cases, the mounting unit is part of a secure container or other locked location and facilitates the delivery of packages to the location. Thus, in these cases, the apparatus for receiving a package delivered by a drone includes a secure container that stores packages delivered by one or more drones, a landing tray disposed outside of the secure container and configured to receive a drone delivering the package, where the landing tray includes an opening configured to allow the package from the drone to fall through the landing tray, and a package tray disposed within the secure container and configured to receive the package from the drone that falls through the opening of the landing tray.

Further, the secure container can be positioned below the landing tray, and the apparatus includes comprising a rail assembly configured to move the package tray out of the secure container in a vertical direction towards the landing tray when receiving the package from the drone that falls through the opening of the landing tray, and move the package tray back into the secure container in the vertical direction when the package from the drone has been delivered to the package tray.

In such a configuration, the package tray is disposed within the secure container when the apparatus is in a standby mode of operation associated with no expected package deliveries to the apparatus. Thus, when the mounting unit is not being used to receive package deliveries, the package tray remains within (or partially within) the secure container. However, upon an indication of a package delivery (e.g., a notification that a delivery is imminent and/or an indication that a drone has landed on the landing tray), the rail assembly moves the package tray to the landing tray for reception of a package.

Thus, the secure container can act to receive and secure packages and may be part of or associated with a package delivery locker associated with a user, a house or building that receives packages for one or more people, and/or a package delivery locker associated with multiple, distinct users for a certain location. For example, a location may provide package delivery and storage locks, and utilize the systems described herein to receive packages for one or more users within the location. Example locations include a street, block, or neighborhood, a campus or dormitory on campus, an office building or location, and so on.

In addition, in some embodiments, a delivery unit can include multiple landing pads or trays, which facilitate the landing or reception of multiple drones. Further, a delivery unit can be customized to the associated building or structure. For example, an apartment may be associated with a small landing pad or unit, whereas a large home can include a large area landing pad having multiple different landing pads (of different sizes or geometries) or units to accommodate different sized package deliveries.

As described herein, the system and delivery or mounting unit can manage the delivery via drones to houses and other facilities, providing safe, efficient access by drones to a drop zone, while maintaining a secure area for package deliveries. The system can be implemented by a single entity (such as a package delivery company), at a certain location, and/or by a drone navigation entity, such as an entity that manages the movement of drones along a navigational highway in the airspace.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

We claim:

1. An apparatus comprising:
   a landing tray configured to receive a drone delivering a package to a house, wherein the landing tray includes an opening configured to allow packages from the drone to fall through the landing tray;
   a secure container that stores delivered packages for the house and includes a package tray disposed below the landing tray and configured to receive the packages from the drone that pass through the opening of the landing tray; and
   a rail assembly configured to:
      move the package tray out of the secure container in a vertical direction towards the landing tray when receiving the packages from the drone that pass through the opening of the landing tray; and
      move the package tray back into the secure container in the vertical direction when the packages from the drone have been delivered to the package tray.

2. The apparatus of claim 1, wherein the landing tray includes one or more infrared beacons that facilitate the drone to align with the opening when landing on the landing tray.

3. The apparatus of claim 1, wherein the landing tray includes a QR code associated with an address of the house that is captured by the drone in order for the drone to confirm a correct address for delivery of the packages.

4. The apparatus of claim 1, wherein the landing tray includes a radio frequency (RF) component associated with an address of the house that sends an RF signal to be captured by the drone in order for the drone to confirm a correct address for delivery of the packages.

5. The apparatus of claim 1, wherein the landing tray includes a force sensor that determines the drone delivering the packages to the house has landed on the landing tray.

6. The apparatus of claim 1, wherein the package tray includes a force sensor that determines the packages have been received from the drone by the package tray.

7. The apparatus of claim 1, further comprising:
   a control unit that sends a notification to a user associated with the house that the packages have been delivered when the packing package tray receives the packages.

8. The apparatus of claim 1, further comprising:
   a control unit that sends a notification to an entity sending the packages that the packages have been delivered when the package tray receives the packages.

9. The apparatus of claim 1, further comprising:
   a control unit that sends a notification that the packages have been delivered when a camera of the apparatus captures an image of the packages disposed within the package tray.

10. An apparatus for receiving a package delivered by a drone, the apparatus comprising:
    a secure container that stores packages delivered by the drone;
    a landing tray disposed outside of the secure container and configured to receive the drone delivering the package, wherein the landing tray includes an opening configured to allow the package from the drone to fall through the landing tray; and
    a package tray disposed within the secure container and configured to move out of the secure container and receive the package from the drone that falls through the opening of the landing tray.

11. The apparatus of claim 10, wherein the secure container is positioned below the landing tray, the apparatus further comprising a rail assembly configured to:
    move the package tray out of the secure container in a vertical direction towards the landing tray when receiving the package from the drone that falls through the opening of the landing tray; and
    move the package tray back into the secure container in the vertical direction when the package from the drone has been delivered to the package tray.

12. The apparatus of claim 10, wherein the package tray is disposed within the secure container when the apparatus is in a standby mode of operation associated with no expected package deliveries to the apparatus.

13. The apparatus of claim 10, wherein the landing tray includes one or more infrared beacons that facilitate the drone to align with the opening when landing on the landing tray.

14. The apparatus of claim 10, wherein the landing tray includes multiple infrared beacons disposed along an edge of the opening that facilitate the drone to align with the opening when landing on the landing tray.

15. The apparatus of claim 10, wherein the landing tray includes a QR code associated with an address of a house that is captured by the drone in order for the drone to confirm a correct address for delivery of the package.

16. The apparatus of claim 10, wherein the secure container is part of a package delivery locker associated with a user.

17. The apparatus of claim 10, wherein the secure container is associated with a house or building that receives packages and is located at least partially within the house or building.

18. The apparatus of claim 10, wherein the secure container is part of a package delivery locker associated with multiple, distinct users for a certain location.

* * * * *